(12) United States Patent
Sugimoto et al.

(10) Patent No.: US 10,371,887 B2
(45) Date of Patent: Aug. 6, 2019

(54) DISPLAY APPARATUS WITH U-SHAPED COUPLING MEMBER

(71) Applicant: Sakai Display Products Corporation, Sakai-shi, Osaka (JP)

(72) Inventors: Arimasa Sugimoto, Sakai (JP); Yasunori Minakuchi, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 0 days.

(21) Appl. No.: 15/321,079

(22) PCT Filed: Sep. 26, 2014

(86) PCT No.: PCT/JP2014/075696
§ 371 (c)(1),
(2) Date: Dec. 21, 2016

(87) PCT Pub. No.: WO2016/046973
PCT Pub. Date: Mar. 31, 2016

(65) Prior Publication Data
US 2017/0205570 A1 Jul. 20, 2017

(51) Int. Cl.
*G02F 1/1339* (2006.01)
*F21V 8/00* (2006.01)
(Continued)

(52) U.S. Cl.
CPC ..... *G02B 6/0088* (2013.01); *G02F 1/133308* (2013.01); *G02F 1/133512* (2013.01);
(Continued)

(58) Field of Classification Search
CPC .......................... G02F 1/133308; G02B 6/0088
See application file for complete search history.

(56) References Cited

U.S. PATENT DOCUMENTS 8,147,113 B2    4/2012    Hamada
8,459,857 B2    6/2013    Shibata et al.
(Continued)

FOREIGN PATENT DOCUMENTS

CN      1847942 A    10/2006
CN    101943351 A    1/2011
(Continued)

OTHER PUBLICATIONS

Sharpe, Foam Rubber vs, Sponge Rubber: What's the difference?, Elasto Proxy Inc., Web Page, Feb. 24, 2017, 3 pages.
(Continued)

*Primary Examiner* — Sean P Gramling
*Assistant Examiner* — Keith G. Delahoussaye
(74) *Attorney, Agent, or Firm* — Rudy J. Ng; Bret E. Field; Bozicevic, Field & Francis LLP (57) ABSTRACT

A display apparatus includes: a display panel displaying an image; a light guide plate facing the display panel. The display panel and the light guide plate are coupled by a coupling member disposed at a peripheral portion of the display apparatus, and an optical sheet being interposed in a void formed between the display panel and the light guide plate. The coupling member includes a leg plate having a strip shape and two side plates protruding inward from both edges in a width direction of the leg plate approximately in parallel to each other. The coupling member is attached in such a way that the leg plate is provided along both a peripheral edge of the display panel and a peripheral edge of the light guide plate, one of the two side plates extending inward is provided along a facing surface of the display panel facing the light guide plate, and the other of the two side plates is provided along at least one surface of the light guide plate.

6 Claims, 4 Drawing Sheets

(51) Int. Cl.
*G02F 1/1333* (2006.01)
*G02F 1/1335* (2006.01)
(52) U.S. Cl.
CPC ............... *G02F 1/133615* (2013.01); *G02F 2001/133317* (2013.01); *G02F 2001/133322* (2013.01); *G02F 2001/133388* (2013.01); *G02F 2202/28* (2013.01)

(56) References Cited

U.S. PATENT DOCUMENTS

| | | | |
|---|---|---|---|
| 9,025,104 | B2 | 5/2015 | Hsiao et al. |
| 2004/0150981 | A1 | 8/2004 | Katsuda et al. |
| 2005/0062899 | A1 | 3/2005 | Fukuyama et al. |
| 2011/0069255 | A1* | 3/2011 | Choi ............... G02B 6/0088 349/63 |
| 2012/0140521 | A1 | 6/2012 | Kao et al. |
| 2012/0162546 | A1 | 6/2012 | Shimomichi |
| 2012/0250354 | A1 | 10/2012 | Yoshida |
| 2013/0044271 | A1 | 2/2013 | Momose et al. |
| 2013/0063681 | A1* | 3/2013 | Zhou ............... G02B 6/0025 349/64 |
| 2013/0300973 | A1 | 11/2013 | Fan et al. |
| 2013/0342789 | A1 | 12/2013 | Zhang et al. |
| 2014/0204275 | A1 | 7/2014 | Shimizu |
| 2014/0204310 | A1 | 7/2014 | Lee et al. |
| 2014/0218656 | A1 | 8/2014 | Maruno |
| 2015/0177548 | A1 | 6/2015 | Jeon et al. |
| 2015/0253612 | A1* | 9/2015 | Hasegawa ......... G02F 1/133308 349/58 |

FOREIGN PATENT DOCUMENTS

| | | |
|---|---|---|
| CN | 102720994 A | 10/2012 |
| CN | 102955290 A | 3/2013 |
| CN | 103148416 A | 6/2013 |
| JP | 2007-232809 A | 9/2007 |
| JP | 2012-118498 A | 6/2012 |
| JP | 2014-142614 A | 8/2014 |
| JP | 2014-154931 A | 8/2014 |
| WO | WO2012169441 A1 | 12/2012 |
| WO | WO2013024712 A1 | 2/2013 |

OTHER PUBLICATIONS

Office Action for U.S. Appl. No. 15/320,308 dated Oct. 16, 2017.
Final Office Action for U.S. Appl. No. 15/320,308 dated May 17, 2018.
Office Action for U.S. Appl. No. 15/320,308 dated Oct. 16, 2018.
Office Action for U.S. Appl. No. 15/324,418 dated Oct. 16, 2017.
Final Office Action for U.S. Appl. No. 15/324,418 dated May 18, 2018.
Office Action for U.S. Appl. No. 15/324,418 dated Oct. 2, 2018.

* cited by examiner

DISPLAY APPARATUS WITH U-SHAPED COUPLING MEMBER

CROSS-REFERENCE TO RELATED APPLICATIONS

This application is the national phase under 35 U.S.C. § 371 of PCT International Application No. PCT/JP2014/075696 which has an International filing date of Sep. 26, 2014 and designated the United States of America.

FIELD

The present disclosure relates to a display apparatus in which an optical sheet is interposed between a display panel and a light guide plate.

BACKGROUND

A display apparatus having a liquid crystal panel as a display panel for displaying images includes a backlight that emits light toward a rear surface of the liquid crystal panel. The display apparatus is configured to modulate and transmit the light emitted from the backlight with the aid of the liquid crystal panel so that an image is displayed on a front surface of the liquid crystal panel. The backlight is broadly classified into a direct type backlight and an edge type backlight. However, in recent years, an edge type backlight is widely used from the perspective of reduction in power consumption and achievement of a low profile of the display apparatus.

An edge type backlight includes a light guide plate and a light source accommodated in a backlight chassis (housing) having a shallow box form. The light guide plate is a flat plate formed of a resin material having a light transmitting property. The light source is provided on one side wall of the backlight chassis so as to face one side surface of the light guide plate, and light emitted from the light source is incident on one side surface of the light guide plate to travel through the inside of the light guide plate and is output so as to be distributed to the entire surface of one wide surface of the light guide plate exposed to outside of the backlight chassis through an opening of the backlight chassis.

The display apparatus is configured so that one wide surface of the light guide plate faces a rear surface of the liquid crystal panel and an optical sheet is interposed between the two facing surfaces. The optical sheet is an optical element that performs a function of diffusing and focusing light, and the light output from the light guide plate is irradiated to the liquid crystal panel by becoming uniform when the light passes through the optical sheet.

Japanese Patent Laid-Open Publication No. 2007-232809 discloses a display apparatus (a display module) in which a light guide plate and a liquid crystal panel are coupled. The light guide plate and the liquid crystal panel are coupled in such a way that the light guide plate and the liquid crystal panel face each other with a void interposed therebetween, the void formed by a spacer interposed in the peripheral portions thereof, an optical sheet is disposed in the void, and an adhesive applied to surround the spacer is cured.

In this display apparatus, the light guide plate, the liquid crystal panel, and the optical sheet are handled as an integrated component, and the integrated component can be sandwiched between a backlight chassis and a bezel (a frame) that covers a peripheral portion of a front surface of the liquid crystal panel. In this way, it is possible to simplify the structure by reducing the number of components and to reduce the thickness of the device.

SUMMARY

On the other hand, in such a display apparatus, there is a demand to reduce a cover width (so-called a frame width) of a peripheral portion of a liquid crystal panel covered by a bezel so that an appearance quality can be improved. In the display apparatus disclosed in Patent Document 1, the above-described spacer and the adhesive as a coupling member are present in the peripheral portion of the liquid crystal panel, and the bezel needs to have such a width that the bezel can cover at least an arrangement region of the spacer and the adhesive. Thus, there is a problem that it is difficult to respond to the demand to reduce the frame width.

Furthermore, since the optical sheet disposed at a region inner than the spacer thermally expands due to heating of the light source resulting from light emission, a gap corresponding to thermal expansion is secured between the optical sheet and the spacer, and it is necessary to set the frame width by taking this gap into consideration. If the gap is decreased to reduce the frame width preferentially, a peripheral edge of the thermally expanded optical sheet comes to the spacer and the optical sheet may be deformed. Conversely, if the frame width is set without taking the gap into consideration, light leaking from the gap may be irradiated to the peripheral portion of the liquid crystal panel. In any case, the distribution of light irradiated to the liquid crystal panel may become uneven and the quality of a displayed image may deteriorate.

In consideration of the above-described circumstance, it is an object of the present disclosure to provide a display apparatus capable of simplifying the structure where a light guide plate and a display panel are coupled together, realizing a low profile of the display apparatus, and responding to the demand to reduce a frame width.

According to an aspect of the present disclosure, there is provided A display apparatus comprising a display panel displaying an image and a light guide plate facing the display panel in which the display panel and the light guide plate are coupled by a coupling member disposed at a peripheral portion of the display apparatus, and an optical sheet being interposed in a void formed between the display panel and the light guide plate, the coupling member includes a leg plate having a strip shape and two side plates protruding inward from both edges in a width direction of the leg plate approximately in parallel to each other, and the coupling member is attached in such a way that the leg plate is provided along both a peripheral edge of the display panel and a peripheral edge of the light guide plate, one of the two side plates extending inward is provided along a facing surface of the display panel facing the light guide plate, and the other of the two side plates is provided along at least one surface of the light guide plate.

The display panel and the light guide plate are coupled by the coupling member including the leg plate that follows the peripheral edges of the display panel and the light guide plate and the side plates extending in the same direction from both edges of the leg plate with the void formed between the facing surfaces, and the optical sheet is interposed in the void. The optical sheet can prevent deformation resulting from thermal expansion by arranging the optical sheet between the peripheral portion and the leg plate of the coupling member while securing a gap corresponding to thermal expansion. Moreover, since the gap is covered by the side plate extending inward from the leg plate, it is possible to alleviate a concern that light leaking from the gap is irradiated to the display panel. A bezel that covers a front surface of the display panel may have a width covering the side plate and can respond to the demand to reduce the frame width while maintaining a good quality of a displayed image.

In the display apparatus according to an aspect of the present disclosure, the coupling member is attached by fixing one of the two side plates to the facing surface of the display panel and fixing the other of the two side plates to a facing surface of the light guide plate facing the display panel, and the void having a dimension corresponding to a width dimension of the leg plate is formed between the facing surfaces.

The coupling member is interposed between the display panel and the light guide plate and is attached by fixing the two side plates to the facing surfaces of the display panel and the light guide plate. The optical sheet is arranged by inserting the peripheral portion between the two side plates and securing a gap corresponding to thermal expansion between the leg plate and the optical sheet. Thus, it is possible to prevent deformation resulting from thermal expansion. Moreover, since the peripheral portion of the optical sheet is covered by the two side plates on the display panel side and the light guide plate side, it is possible to reliably alleviate a concern that light leaking from the gap is irradiated to the display panel.

In the display apparatus according to an aspect of the present disclosure, the width of the leg plate is longer than a thickness of the light guide plate, and the coupling member is attached in such a way that one of the two side plates is fixed to the facing surface of the display panel, the other of the two side plates is fixed to a non-facing surface of the light guide plate not facing the display panel, and the leg plate faces a side surface of the light guide plate, and the void having a dimension corresponding to a difference between a width dimension of the leg plate and a thickness dimension of the light guide plate is formed between the facing surfaces.

In the display apparatus according to an aspect of the present disclosure, the width of the leg plate is longer than a thickness of the light guide plate, and the coupling member is attached in such a way that one of the two side plates is fixed to the facing surface of the display panel, the other of the two side plates comes to a non-facing surface of the light guide plate not facing the display panel, and the leg plate is fixed to a side surface of the light guide plate, and the void is corresponding to a difference between a width dimension of the leg plate and a thickness dimension of the light guide plate formed between the facing surfaces.

The width of the leg plate of the coupling member is larger than the thickness of the light guide plate, and the coupling member is attached in such a way that one side plate is fixed to the facing surface of the display panel and the other of the two side plates is fixed to the non-facing surface of the light guide plate, or the leg plate is fixed to the side surface of the light guide plate. The void having a dimension corresponding to the difference between the width dimension of the leg plate and the thickness dimension of the light guide plate is secured between the display panel and the light guide plate, and the optical sheet is interposed in the void. The optical sheet can prevent deformation resulting from thermal expansion by securing the gap corresponding to the thermal expansion between the leg plate and the optical sheet. Moreover, since the gap is covered by the side plate proximal to the display panel, extending inward from the leg plate, it is possible to reduce light leaking from the gap. Furthermore, the leg plate is arranged so as to surround the light guide plate to provide a function of reinforcing the light guide plate. Thus, it is possible to enhance the coupling strength between the light guide plate and the display panel.

The display apparatus according to the embodiment of the present disclosure can simplify the structure where a light guide plate and a display panel are coupled together realized by coupling a light guide plate and a display panel, realize a low profile of the display apparatus, and respond to the demand to reduce a frame width while preventing deterioration in the image quality resulting from deformation of an optical sheet and light leaking from a peripheral portion of the optical sheet.

The above and further objects and features will more fully be apparent from the following detailed description with accompanying drawings.

DETAILED DESCRIPTION

Figure 1:
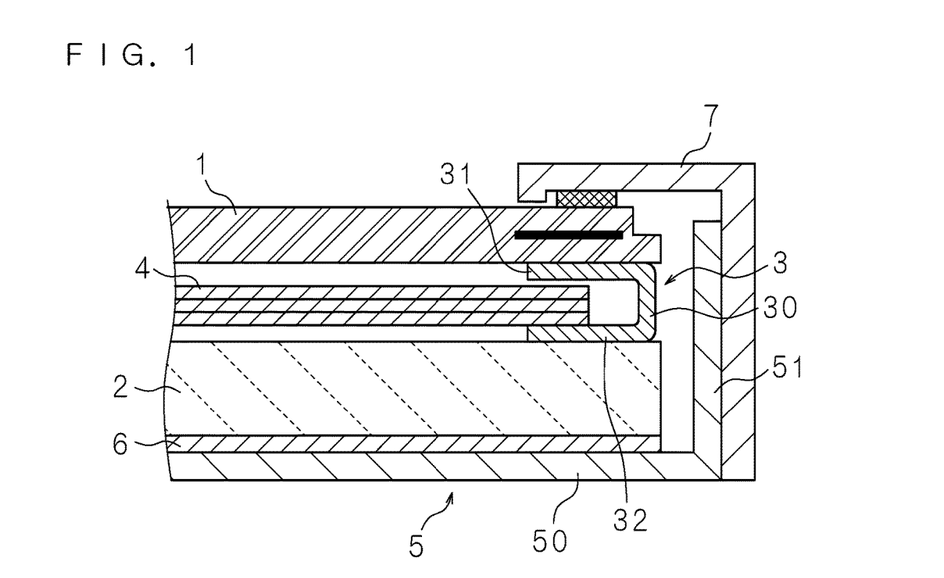
FIG. 1 is a cross-sectional view schematically illustrating a configuration of main parts of a display apparatus according to Embodiment 1.

Hereinafter, the present disclosure will be described with reference to the drawings that illustrate embodiments of the present disclosure. FIG. 1 is a cross-sectional view schematically illustrating a configuration of main parts of a display apparatus according to Embodiment 1.

As illustrated in the drawing, a display apparatus includes a liquid crystal panel (a display panel) 1 and a light guide plate 2 coupled to the liquid crystal panel 1 by a coupling member 3 to be described later. The liquid crystal panel 1 has a known configuration in which a liquid crystal is enclosed between two glass substrates, which are almost the same size and light irradiated to one of two wide surfaces (a rear surface) is modulated by the liquid crystal which is driven selectively and is allowed to pass through the liquid crystal to display an image on the other of the two wide surfaces (a front surface).

The light guide plate 2 is a flat plate formed of a transparent resin such as an acryl resin and a dot pattern having a function of scattering light is formed on one wide surface (a rear surface). The other of the two wide surfaces (a front surface) of the light guide plate 2 faces an approximately entire surface of the rear surface of the liquid crystal panel 1 with a predetermined void interposed therebetween, and an optical sheet 4 is disposed in this void. The optical sheet 4 is formed by stacking one diffusion sheet and two prism sheets, for example.

Figure 2:
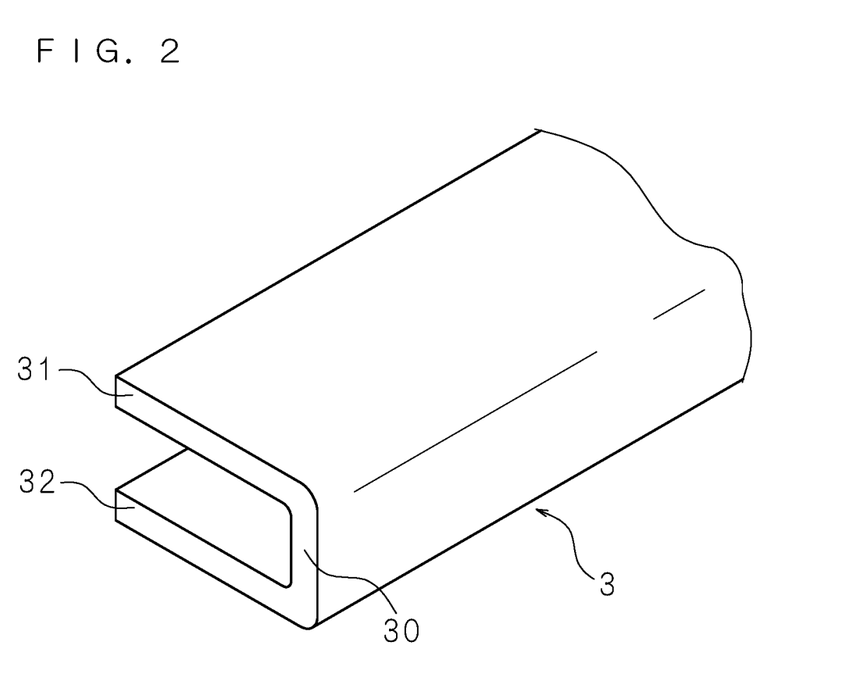
FIG. 2 is a perspective view of a coupling member.

FIG. 2 is a perspective view of the coupling member 3. As illustrated in this drawing, the coupling member 3 is an angle member having a U-shaped cross-section, including a thin flat plate-shaped leg plate 30 having a strip shape and two side plates 31 and 32 which protrude from both edges in a width direction of the leg plate 30 in the same direction at the right angle with respect to the leg plate 30 and are parallel to each other. The coupling member 3 can be formed by bending a metal plate or extruding a resin material, for example.

As illustrated in FIG. 1, the coupling member 3 is attached between the liquid crystal panel 1 and the light guide plate 2 by arranging the leg plate 30 so as to follow the peripheral edges of the liquid crystal panel 1 and the light guide plate 2 and fixing the side plates 31 and 32 extending inward to the rear surface of the liquid crystal panel 1 (that is, the facing surface of the liquid crystal panel 1) and the front surface of the light guide plate 2 (that is, the facing surface of the light guide plate 2). Fixing of the side plates 31 and 32 can be realized by adhesion using an adhesive or a double sided tape.

It is required that the coupling member 3 is attached to the entire circumference of the liquid crystal panel 1 and the light guide plate 2. If the liquid crystal panel 1 and the light guide plate 2 have a general rectangular flat plate shape, this attachment is realized by attaching the coupling member 3 having a length corresponding to each side of the rectangular flat plate so as to follow the respective sides and bonding at the respective corners. Moreover, a plurality of coupling members having fixed dimensions may be connected and attached so as to follow the respective sides of the liquid crystal panel 1 and the light guide plate 2. According to this configuration, the same coupling member 3 can be used for the liquid crystal panel 1 and the light guide plate 2 of various sizes.

Due to the coupling member 3 having the above-described configuration, the liquid crystal panel 1 and the light guide plate 2 are coupled in a state of facing each other with a void interposed therebetween, having a dimension corresponding to the width dimension of the leg plate 30. The optical sheet 4 is interposed between the liquid crystal panel 1 and the light guide plate 2 by such a procedure that the optical sheet 4 is stacked so as to cover the front surface of the light guide plate 2 after the side plate 32 is fixed to the peripheral portion of the light guide plate 2, and then, the side plate 31 is fixed to the peripheral portion of the liquid crystal panel 1.

Since the optical sheet 4 thermally expands during use to be described later, it is necessary to secure a gap corresponding to the thermal expansion for the peripheral portion of the optical sheet. The interposed optical sheet 4 as described above can be disposed in a state in which the light guide plate 2 is not exposed to outside of the peripheral portion while securing a gap corresponding to the thermal expansion between the leg plate 30 and the optical sheet 4 as illustrated in FIG. 1 by inserting the peripheral portion between the facing surfaces of the side plates 31 and 32.

The liquid crystal panel 1 and the light guide plate 2 coupled by the coupling member 3 are accommodated inside a housing 5 having a shallow box shape by placing the light guide plate 2 on a bottom plate 50 of the housing 5 with a reflecting sheet 6 interposed therebetween. The display apparatus is formed by covering the peripheral portion of the front surface of the liquid crystal panel 1 exposed to outside of the backlight chassis through the opening of the housing 5 with a frame-shape bezel 7 fitted and fixed to the side plate 51 of the housing 5 and sandwiching the liquid crystal panel 1 and the light guide plate 2 between the bezel 7 and the housing 5. In the display apparatus having such a configuration, the light guide plate 2, the liquid crystal panel 1, and the optical sheet 4 are handled as an integrated component, and the integrated component can be sandwiched between the bezel 7 and the housing 5. In this way, it is possible to simplify the structure by reducing the number of components and to reduce the thickness of the device.

A light source (not illustrated) is attached to the side plate 51 of the housing 5 facing one side surface of the light guide plate 2. The light source is, for example, formed by mounting a plurality of LEDs on one surface of a strip-shaped substrate so as to be arranged in a longitudinal direction and a light emission surface of each LED faces one side surface of the light guide plate 2. The light source may be other known light sources such as a cold cathode-ray tube.

The light emitted by the light source attached in this manner is incident on one side surface of the light guide plate 2, travels through the inside of the light guide plate 2 while repeating total reflection in the reflecting sheet 6 provided on the rear surface and partial reflection on the front surface, and is output so as to be distributed to the entire front surface. The light output from the light guide plate 2 becomes uniform by the diffusing and focusing function of the optical sheet 4 and is irradiated to the rear surface of the liquid crystal panel 1. The liquid crystal panel 1 modulates and transmits the irradiation light to display an image on the front surface.

As described above, the optical sheet 4 is disposed with inserting the peripheral portion between the facing surfaces of the side plates 31 and 32 of the coupling member 3, and the light guide plate 2 is not exposed to outside of the optical sheet 4. Therefore, a total amount of the light output from the light guide plate 2 is irradiated to the liquid crystal panel 1 through the optical sheet 4, and the quality of the image displayed on the front surface of the liquid crystal panel 1 can be maintained well. Moreover, as illustrated in FIG. 1, the width (so-called a frame width) of the bezel 7 that covers the peripheral portion of the front surface of the liquid crystal panel 1 may be set to such a width that the bezel 7 can cover the area corresponding to the side plate 31, and it is possible to respond to the demand to reduce the frame width.

Moreover, although the optical sheet 4 thermally expands due to heating resulting from the light emission of the light source or the like, this thermal expansion can be absorbed by the gap secured between the peripheral edge of the optical sheet 4 and the leg plate 30 of the coupling member 3. Therefore, it is possible to eliminate a concern that the peripheral edge of the thermally expanded optical sheet 4 is deformed by coming to the leg plate 30 and the light irradiated to the liquid crystal panel 1 becomes uneven, and to maintain a good quality of the image displayed on the front surface of the liquid crystal panel 1.

Figure 3:
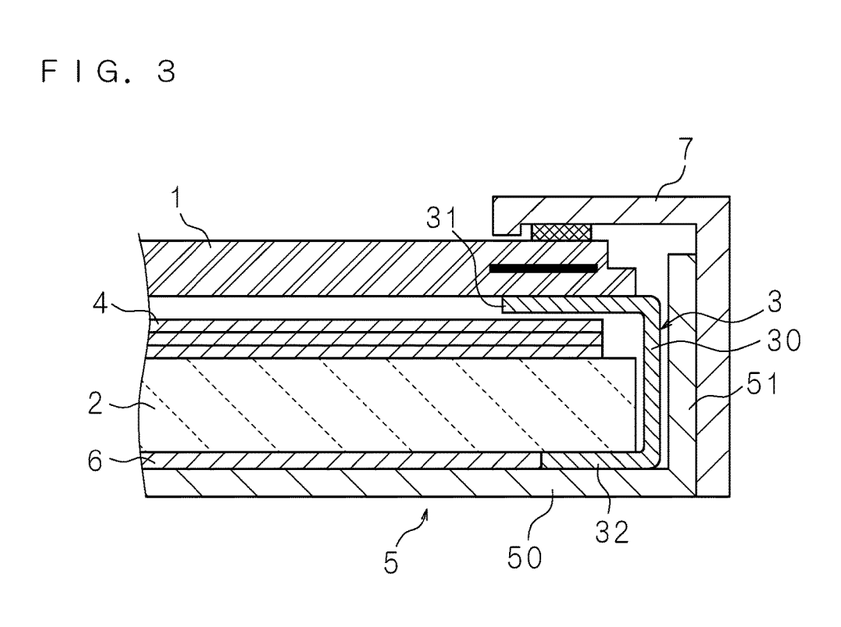
FIG. 3 is a cross-sectional view schematically illustrating a configuration of main parts of a display apparatus according to Embodiment 2.

FIG. 3 is a cross-sectional view schematically illustrating a configuration of main parts of a display apparatus according to Embodiment 2. This display apparatus is the same as the display apparatus according to Embodiment 1 except the shape and the attachment aspect of the coupling member 3, and the corresponding constituent members will be denoted by the same reference numerals as those of Embodiment 1, and the description of the configuration and the operation will not be provided.

A coupling member 3 of Embodiment 2, similarly to the coupling member 3 of Embodiment 1, includes a thin flat-plate shaped leg plate 30 and a pair of side plates 31 and 32 which protrude from both edges of the leg plate 30 and extend in parallel in the same direction. Moreover, as illustrated in FIG. 3, the coupling member 3 has such a wide U-shaped cross-section that the width of the leg plate 30 is larger than the thickness of the light guide plate 2. The coupling member 3 having such a configuration is attached by arranging the inner surface of the leg plate 30 so as to follow the side surface of the light guide plate 2, fixing one side plate 32 extending inward to the peripheral portion of the rear surface (a non-facing surface) of the light guide plate 2, and fixing the another side plate 31 extending inward at a position distant from the front surface of the light guide plate 2 to the rear surface (a facing surface) of the liquid crystal panel 1.

Figure 4:
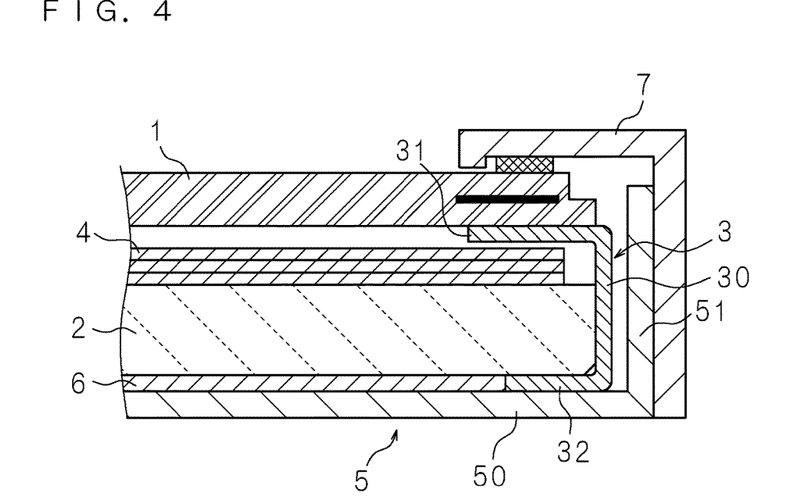
FIG. 4 is a cross-sectional view schematically illustrating a configuration of main parts of a display apparatus according to Embodiment 3.

FIG. 4 is a cross-sectional view schematically illustrating a configuration of main parts of a display apparatus according to Embodiment 3. This display apparatus is the same as the display apparatus according to Embodiment 2 except the attachment aspect of the coupling member 3, and the corresponding constituent members will be denoted by the same reference numerals as those of Embodiments 1 and 2, and the description of the configuration and the operation will not be provided.

A coupling member 3 of Embodiment 3 has a wide U-shaped cross-section similarly to Embodiment 2 and is attached by arranging one side plate 32 extending inward to come to the peripheral portion of the rear surface (a non-facing surface) of the light guide plate 2 and fixing the inner surface of the leg plate 30 to the side surface of the light guide plate 2 and fixing the another side plate 31 extending inward at a position distant from the front surface of the light guide plate 2 to the rear surface (a facing surface) of the liquid crystal panel 1.

In Embodiments 2 and 3, the liquid crystal panel 1 and the light guide plate 2 are coupled in a state of facing each other with a void interposed therebetween having the dimension corresponding to a protrusion width dimension of the leg plate 30 toward the front surface of the light guide plate 2, that is, a difference between the thickness dimension of the light guide plate 2 and the width dimension of the leg plate 30. The optical sheet 4 is interposed in the void between the liquid crystal panel 1 and the light guide plate 2 by such a procedure that the optical sheet 4 is stacked so as to cover the front surface of the light guide plate 2 after the coupling member 3 is fixed to the light guide plate 2, and then, the side plate 31 is fixed to the liquid crystal panel 1.

The optical sheet 4 can be disposed in a state in which the front surface of the light guide plate 2 exposed to outside of the peripheral portion of the optical sheet 4 is covered by the side plate 31 while securing a gap corresponding to the thermal expansion between the leg plate 30 and the optical sheet 4 as illustrated in FIGS. 3 and 4, by inserting the peripheral portion between the facing surfaces of the side plate 31 and the light guide plate. Therefore, similarly to Embodiment 1, it is possible to prevent deformation of the optical sheet 4 resulting from thermal expansion, to alleviate a concern that light which has not passed through the optical sheet 4 is irradiated to the liquid crystal panel 1, and to maintain a good quality of the image displayed on the front surface of the liquid crystal panel 1.

Since the coupling member 3 of Embodiments 2 and 3 is disposed so that the light guide plate 2 is surrounded by the leg plate 30, it is possible to reinforce the light guide plate 2 and to enhance the coupling strength between the light guide plate 2 and the liquid crystal panel 1. Moreover, since the side surface of the light guide plate 2 is covered by the leg plate 30, it is not possible to use on a region proximal to the light guide plate 2 where the light source is arranged, and it is necessary to use the coupling member in combination with the coupling member 3 of Embodiment 1. In Embodiment 3, a coupling member 3 having an L-shaped cross-section which does not have the side plate 32 that comes to the rear surface of the light guide plate 2 may be used.

It is to be noted that, as used herein and in the appended claims, the singular forms "a", "an", and "the" include plural referents unless the context clearly dictates otherwise.

It should be understood that the embodiments disclosed herein are illustrative and non-restrictive in every respect. The scope of the present invention is defined by the scope of the claims, rather than the description above, and is intended to include any modifications within the scope and meaning equivalent to the scope of the claims.

The invention claimed is:

1. A display apparatus, comprising:
a display panel for displaying an image;
a light guide plate having a front surface facing the display panel and a rear surface which is opposite to the front surface;
a coupling member disposed at a peripheral portion of the display apparatus and coupling the display panel and the light guide plate in a state of facing each other with a void interposed therebetween; and
an optical sheet being interposed in the void,
wherein
the coupling member extends in a longitudinal direction of a side surface of the light guide plate and is a U-shaped bent plate having a U-shaped cross-section orthogonal to the longitudinal direction, wherein there are no parts extending from the U-shaped bent plate,
the coupling member consists of a leg plate having a strip shape of which a flat surface being parallel to the side surface of the light guide plate and a first side plate and a second side plate respectively protruding inward from a front edge and a rear edge of the leg plate, wherein the front edge is close to the display panel and the rear edge is close to the light guide plate, and the first side plate and the second side plate are approximately in parallel to the display panel, and
the coupling member is attached in such a way that the leg plate is provided along both a peripheral edge of the display panel and a peripheral edge of the light guide plate, the first side plate is provided along the rear surface of the display panel facing the light guide plate, and the second side plate is provided along the front surface or the rear surface of the light guide plate, so that the display panel, the light guide plate and the coupling member are integrated as a single component,
the coupling member does not connect to any portions which are configured outside of the light guide plate,
wherein either the coupling member only contacts the display panel, the optical sheet and the light guide plate, or the coupling member only contacts the display panel and the light guide plate.

2. The display apparatus according to claim 1, wherein the coupling member is attached by fixing the first side plate to the rear surface of the display panel and fixing the second side plate corresponding to the front surface of the light guide plate, and the void having a height corresponding to a length from the front edge to the rear edge of the leg plate is formed between the rear surface of the display panel and the second side plate corresponding to the front surface of the light guide plate.

3. The display apparatus according to claim 1, wherein the length from the front edge to the rear edge of the leg plate is longer than a thickness of the light guide plate between the front surface and the rear surface thereof, and
the coupling member is attached in such a way that the first side plate is fixed to the rear surface of the display panel, the second side plate is fixed to the rear surface of the light guide plate, and the leg plate faces the side surface of the light guide plate, and the void having a height corresponding to a difference between a length from the front edge to the rear edge of the leg plate, and the thickness of the light guide plate is formed between the rear surface of the display panel and the second side plate corresponding to the front surface of the light guide plate.

4. The display apparatus according to claim 1, wherein the length from the front edge to the rear edge of the leg plate is longer than a thickness of the light guide plate between the front surface and the rear surface thereof, and the coupling member is attached in such a way that the first side plate is fixed to the rear surface of the display panel, the second side plate comes to the rear surface of the light guide plate, and the leg plate is fixed to the side surface of the light guide plate, and the void corresponds to a difference between a length from the front edge to the rear edge of the leg plate and the thickness of the light guide plate formed between the rear surface of the display panel and the second side plate corresponding to the front surface of the light guide plate.

5. The display apparatus according to claim 1, further comprising:
   (i) a housing having a shallow box shape which includes a bottom plate and a side wall surrounding the bottom plate; and
   (ii) a bezel which includes a front plate having a frame shape and a side plate surrounding the front plate and being fitted and fixed to the side wall of the housing,
   wherein the light guide plate is placed on the bottom plate of the housing with a reflecting sheet interposed therebetween, the front plate of the bezel covers the peripheral portion of the front surface of the display panel.

6. The display apparatus according to claim 1, wherein in case where the coupling member does not attach to the optical sheet, the optical sheet is on the front surface of the light guide plate.

\* \* \* \* \*